Figure 1:
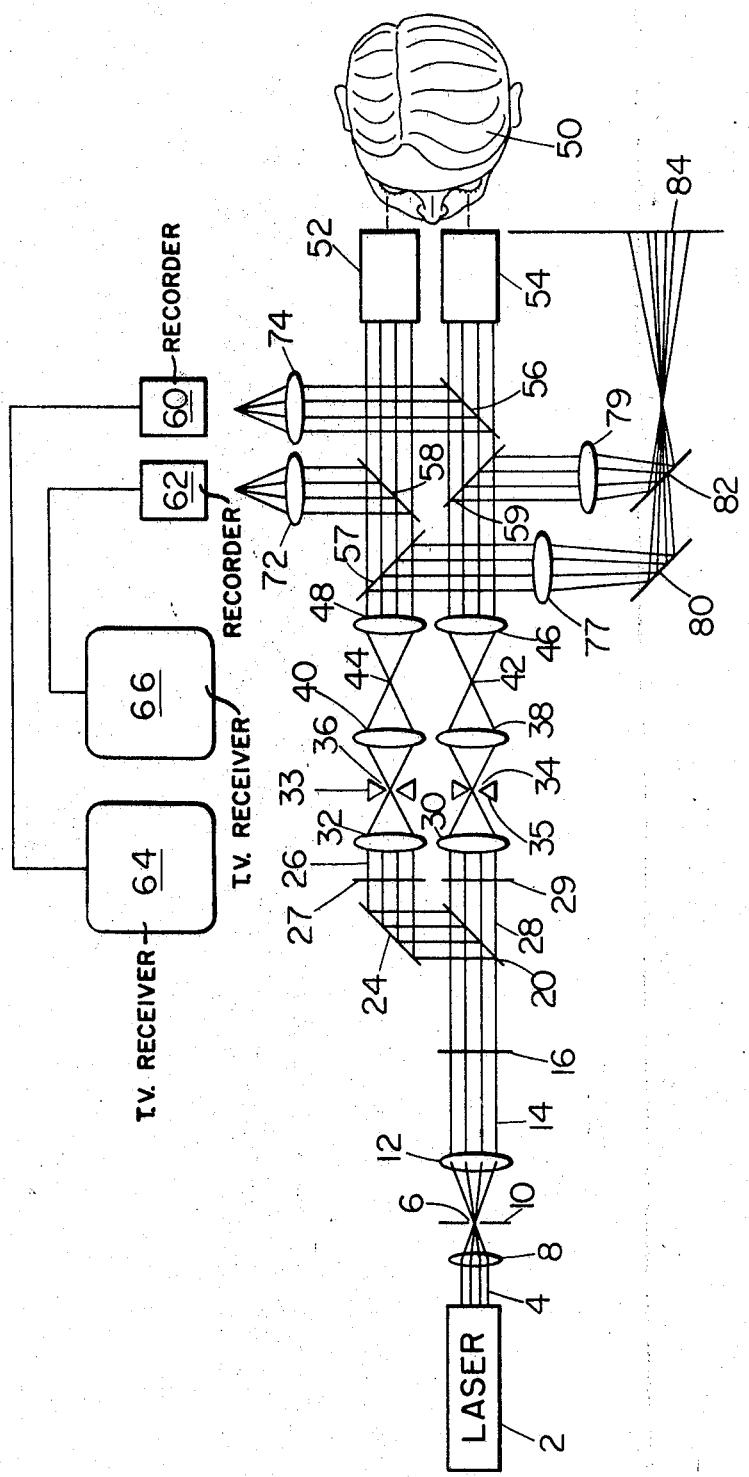

INVENTOR.
JOHN B. FARR
BY Paul F. Hawley
ATTORNEY.

United States Patent Office 3,524,706
Patented Aug. 18, 1970

3,524,706
METHOD AND APPARATUS FOR OPTICALLY PROCESSING SEISMIC DATA USING SPATIAL FILTERING TECHNIQUES
John B. Farr, Tulsa, Okla., assignor to Pan American Petroleum Corporation, Tulsa, Okla., a corporation of Delaware
Filed June 10, 1966, Ser. No. 556,740
Int. Cl. G06k 9/08
U.S. Cl. 356—71    5 Claims The present invention relates to an improved method and apparatus for the processing of seismic survey data. More specifically, it is concerned with an improved technique for enhancing and evaluating geophysical information by the use of optical filtering procedures.

Data dealing with the depth and attitude of subsurface strata obtained by the seismic method usually consist of many somewhat similar time varying electrical signals. Each signal represents vibratory motion at a specific location on the earth's surface. Such signals result, principally, from the arrival at the surface transducer or geophone of wave motion initiated by a man-made disturbance at or near the surface. A dynamite explosion is conventionally used for this purpose. The resulting train of wave motion received by the geophones includes seismic energy which has been reflected from subsurface strata. The time required for a seismic wave to travel downward into the earth and be reflected back to the surface from buried acoustic interfaces is determined to find the depth to the reflecting strata. The electrical signals generated by the geophones, usually with a duration of one to five seconds, are displayed in a choice of several ways; these displays permit study of the relationship between signals from subsurface beds and when appropriate corrections are applied, show subsurface strata as structural elements.

One of the most useful display techniques is that known as the variable density or variable area cross section. To prepare a display of this form, the electrical signal representing earth motion are converted into light beams which vary in intensity or area with the electric signals. These are recorded photographically as side by side strips. This resulting multiplicity of tracks or traces represent the relationship of seismic signals from the location on the earth's surface where they were derived.

Adjacent traces usually show a marked similarity since they are the analog of seismic waves which have been produced by reflection of energy impinging on subsurface strata. If such a cross section is oriented with the reflections from near-surface beds at the top of the chart and those from successively deeper beds extending toward the bottom of the chart, the general image produced is similar in appearance to a vertical slice taken through the earth along the line of geophones.

In areas where the acoustic wave paths through the earth do not encounter complex geological features, the resulting cross section is relatively free from confusing features; where this is not the case, the resulting data as initially recorded may defy analysis and interpretation. An increasing number of areas are being surveyed where the data present interpretation problems of increasing complexity. The expanding need for petroleum continues to provide the impetus to improve seismic methods and apparatus. My present invention is such a development; the advantages will become apparent as the details are set forth.

Interpretation of geophysical data displayed in any of the present forms is, to a great extent, subjective, relying heavily upon the experience of the interpreter. Because of this subjective nature of the interpretation, it is of prime importance that the data display be as free as possible from extraneous and spurious features. For example, signals resulting from reverberation within structural members or in water bodies overlying areas being surveyed, may produce recorded events that exhibit many of the same characteristics as valid subsurface data. It is a function of the geophysical interpreter to distinguish the valid from the spurious. My invention is of considerable assistance in eliminating unwanted and confusing events which often are so intimately intermixed with valid data that it is virtually impossible to evaluate one without interference from the other.

By the use of the present invention a stereo view presentation of these data is made possible. This technique, coupled with the ability to examine rapidly the effect of different filters upon either of the two stereo images, facilitates choosing the elements of the total display which best portray a logical and coherent geologic situation.

The traditional method by which seismic signals are enhanced involves the use of electric filters. These are capable of accentuating or rejecting chosen portions of the seismic spectrum, usually portions of the frequency band lying between 10 and 100 cycles per second. The equivalent of this type of electrical filtering may be readily accomplished by optical means. The latter method which can treat the entire cross section as a whole has a number of advantages over those systems which process the electrical signals a trace at a time. Aside from a severalfold speed advantage unique to the optical method, it possesses great analytical power afforded by the fact that it considers the relationship between traces and between groups of traces. In fact, a cross section representing subsurface information from survey lines many miles long may be treated as elements of the entire data display. Other data processing methods, either digital or analog, which process the data a trace at a time afford no adaptive adjustment to the features of adjacent traces. These advantages are inherent in the optical system used for seismic data analysis and will become obvious as the basic details of the system are revealed; to these, then, are added the improvements contributed by the present invention.

The operating principle of the optical method is based on discoveries in the behavior of light made by Fraunhofer in the study of diffraction and spectroscopy. The French mathematician Fourier developed the relationship between a diffracting object and the optical pattern which is developed in the transform plane. In the case of seismic data analysis, the cross section described above serves as the diffracting object. The seismic section, usually in greatly reduced form and as a film transparency, is illuminated to provide the input data to a typical optical processing apparatus. Features on the section which represent subsurface beds by depicting them essentially as bands, form elements of a diffraction grating; each element, having been derived from the original section is related to it in a known way. When a beam of light is passed through such a transparency, the lines of alternately clear and opaque film representing subsurface information, serve as a grating and the impinging light beam is divided into rays which are bent in accordance with the optical principles set down by Fraunhofer and Fourier. When these bent or diffracted rays are brought to a focus by a suitable lens, the diffracted rays resulting from features of the cross section are separated from the central light beam and are positioned around it in a manner related to the spatially frequency and orientation of the corresponding features on the seismic cross section. Because of this separation of the seismic information into a spectrum of frequencies and angular position, which are located in the Fourier transform plane with respect to the orientation of features on the seismic section with the components of the seismic section thus separated, removal of undesirable data elements may be accomplished by placing opaque masks or filters of selected shape, density, and/or phase delay in the optical transform plane. The portion of the diffraction pattern and the central beam that are permitted to pass the masks or filters are refocused to form an output image. This image is similar to the input section except that those spatial frequency and angular elements which were removed at the transform plane are absent from the reconstructed image. Such a processing system was described in greater detail in the article "Velocity and Frequency Filtering of Seismic Data Using Laser Light," by Milton B. Dobrin et al., published in Geophysics, vol. 30, No. 6 (1965), p.1144.

My invention uses apparatus and procedure as set out above. No claim is made herein to these. They are described only to aid in understanding the operation and usefulness of the improvements provided by the present invention.

Two distinctly different modes of operation are available to the operator by making only minor changes in the apparatus. Each is best suited to perform particular optical filtering operations. The essential differences between the two modes result from introducing the input information at different positions in the optical system. In the first, the input material is introduced to modulate the light beam at a point prior to its division into two equivalent beams, each of which at this point carries identical information. In the other mode of operation, the initial light beam is divided into two identical beams before being spatially modulated. In this procedure, the same or different input data may be introduced into each of the two beams. The two methods will be described separately.

In the first method the novel improvements I obtain result from the light beam of the conventional method being spatially modulated by the input data before it is divided into two essentially equivalent beams. With suitable optical arrangement a transform is generated in each of the identically modulated beams. With the two transform patterns thus created, areas may now be masked in either or both. To illustrate: By the use of my invention I may place a mask to obstruct the passage of selected parts of the input data in one transform, while in the other transform I introduce a mask to remove other features; in some cases I will not alter one transform while obstructing parts of the other. In any case, introduction of such masks results in selectively obstructed beams of light beyond the masks in which the selected features of the input data are now eliminated.

After having modified at least one of the two beams by optically suppressing selected features, I simultaneously view the two reconstructed images. A binocular arrangement is convenient for this purpose. In the same manner in which a binocular microscope or binocular telescope present slightly different images to the two eyes of the observer, the apparatus of my invention may be adjusted to present identical or different images to the two eyes of the observer. The images received by each eye are positioned to superimpose in the registration of these images in the brain to provide the visual sensation of a single image.

There are several other means of displaying the output information from such a dual channel device. The preferred method in each case will be governed by the nature of the input data, the purpose of the optical filtering steps to be performed and whether the resulting data is to be viewed by one or several observers. It is obvious that a stereo camera may be substituted for the two eyes of the observer. The two images may be photographed and subsequently examined with a conventional stereoscopic viewer. Electronic image cameras such as closed circuit television may, of course, be used in place of film cameras. The resulting electrical signals may either be displayed on two picture tubes and viewed stereoscopically or they may be electrically superimposed to form a single picture.

Yet another characteristic of this system may be employed by the interpreter to rapidly compare the same cross section with and without selected features removed. This is accomplished by alternately totally masking first one and then the other of the two channels.

Another advantageous mode of operation is utilized when confusing features are masked from one image and not from the other. Under stereoscopic examination the impression produced is one of looking through the disturbing feature to observe the underlying data.

In the preferred method of operation the present invention provides to be observer a synthetic three-dimensional view of the input data displayed as a two-dimensional chart or cross section. The three-dimensional effect is an illusion created by modifying the transform of one beam with respect to the transform of the other beam. The purpose in producing the three-dimensional display is to aid the observer in separating signals from noise, the spurious from the genuine information.

One manner in which this interpretational advantage may be obtained is by permitting the passage of a slightly different frequency content in the images carried by the two beams. For instance, if the same information is divided into two beams and is caused to produce two identical transforms and appropriate filters are introduced into the respective transforms having somewhat different characteristics, the three-dimensional effect will be produced in the stereoscopic output of the device. Specifically, if in one transform only the right dipping beds are permitted to pass and in the other transform only the left dipping beds are permitted to pass, the stereoscopic output will construct an image in which events of one dip angle will appear to stand out from the plane of the cross section at a different distance than events of a different dip. This separation of the input information into a third dimension, that is, into a number of planes which appear to lie above and below the surface of the cross section permits an interperter to follow confidently across the section subsurface features which are lost in confusion on the original cross section. Instead of producing a synthetic three-dimensional effect by differences in dip angle as above, a similar impression may be produced through the use of frequency band passes which are somewhat different in their coverage. The effect here is to separate data of different frequency content into planes which appear above and below the surface of the input cross section.

The second mode of operation in which the light beams are modulated after being divided has the effect of accentuating selected geological features.

Still another way in which my invention serves as a powerful analytical tool is based on its ability to direct the attention of the observer to the occurrence of selected types of subsurface structural cnfigurations.

Unlike the first-described mode of operation, in this procedure the optical beam is not modulated by the film transparency before it is split into two parts. Instead, the beam is divided to make two equal beams, then each of the new beams is passed through separate film transparencies. Both transparencies may be made from the same seismic cross section but preferably one is a negative, the other a positive. By controlling the photographic density when these complementary films are made, they will produce a field of neutral gray, essentially without modulation features when their images are superimposed. In the case of my invention, at least one Fourier transform is produced in each of these separately spatially modulated beams. Into the transforms of either of these beams may be introduced light obstructing masks appropriate to the filtering action sought. Having proceeded beyond the respective transform planes, the two beams may be recombined by superposition, or they may be simultaneously examined in binocular fashion. In either case, when no portion of the transform is eliminated from either beam, the reconstructed image will be a neutral, unmodulated gray field. However, if selected features of the information are blocked from either, but not both, of the transform patterns, these features will be the only details which contrast with the gray field of the output image.

To illustrate the use of the above technique, let us assume it is required that all subsurface strata which are recorded on the input section with a particular dip angle are to be studied and evaluated. Where the recorded data is relatively free of spurious events, this study may be carried out by any of several means. However, where the events of of interest are submerged in seismic noise and confused by superimposed recorded events, my present invention will selectively accentuate any characteristic of the input information if that characteristic can be isolated in the Fourier transform on the basis of orientation or frequency content. In the Fourier plane of one beam all events at this dip angle are masked by an opaque filter. Having thus eliminated certain elements of one transform, the identical but complementary feature in the transform of the other light beam is no longer balanced to the neutral gray of the output image and now stands out in bold contrast to the otherwise featureless output image field.

In the same manner any other selected characteristics may be emphasized. As a further example, consider the case where it is desirable to accentuate a particular frequency and to accurately determine all locations on the cross sections at which such frequencies occur. To do this it is only necessary to mask from one transform the frequencies which are to be studied. The output image which results from the superposition of the two beams will again present a featureless gray field except for the frequencies which have been removed from the transform of either the negative or positive transparency. Without this light balancing action, the selected frequencies are contrasted against the otherwise featureless field of the output and the location at which such frequencies occur on the cross section is clearly indicated.

With respect to either mode of operation it is an object of my invention to provide a method and apparatus for the enhancement of seismic data (or its equivalent) by the optical process of constructing duplicate or similar diffraction transforms of the input information and accentuating selected features by modifying one of the transforms relative to the other.

It is another object of my invention to provide a method and apparatus for simultaneously viewing the same information in modulated light beams with and without filtering treatment.

It is also an object of the present invention to produce from the original input data display an impression of a third dimension. The purpose of creating the impression of a three-dimensional display of the input data is to aid in separating features of the data in such a way that related elements may be recognized in the presence of confusing events, in the presence of noise, and other features which degrade data quality.

It is yet another object of my invention to accentuate features of the input information which have designated characteristics. The manner in which these objectives are accomplished will be readily understood when the following description is read in connection with the drawing.

FIG. 1 is a schematic representation of optical components and ray paths of the preferred embodiments of my invention.

Referring now in detail to FIG. 1, it will be seen that the preferred light source is a continuous wave laser 2. The coherent light beam 4 emerging from the laser is focused to a point 6 by lens 8. At focal point 6 the light passes through aperture 10 and diverges to lens 12 where it is collimated to a parallel beam 14. In one mode of operation beam 14 is spatially modulated by being passed through input data transparency 16. To this point my invention relies upon the established art in this field. Beyond this point, however, I have introduced novel features in the apparatus and in the methods of using same which produce new and desirable results. After the point at which input section 16 has been introduced into the beam, I position an optical beam splitter consisting of a semi-transparent mirror 20. The characteristics of transmission and reflectance of mirror 20 are such that essentially half the incident light beam passes unaltered to lens 30; the other portion of the beam is diverted at essentially a right angle to impinge on mirror 24 which is oriented in such a manner that the reflected beam 26 assumes a position and direction essentially parallel to the undeflected portion of the beam 28. Positive lenses 30 and 32 focus the respective light beams to form Fourier transforms 34 and 36, respectively. These transforms, being composed of data from the same source, are themselves essentially identical. Into the plane of either transform may be placed appropriate masks 33 and 35 to optically block selected frequencies and/or orientations of the original data. Emerging from the transform planes 34 and 36, the two beams are separately collected by lenses 38 and 40. These lenses now form second transforms 42 and 44 in each beam. The purpose of forming two successive transforms in each beam is to provide locations in which successive and ordinarily different types of filtering may be performed. As an example, at transform 34, masks may be introduced to permit the passage of only cerain spatial frequencies. The beam thus stripped of a portion of its initial information, arrives at the second transform 42 where other features such as data from all beds dipping at a selected angle may be removed. Beyond transforms 42 and 44, respectively, lenses 46 and 48 return the respective beams to an essentially collimated condition. From this point the information in the two parallel beams may be viewed or displayed in any of several different manners. The most direct of these is illustrated by observer 50 viewing the two beams with right and left eyes, respectively, by the aid of microscopes 52 and 54.

Alternatively by use of half-silvered mirrors 56 and 58 a portion of each of the two beams may be diverted to lenses 72 and 74 to be focused upon recording means 60 and 62. Such auxiliary means may consist of photographic recording films or television cameras operating in conjunction with television receivers 64 and/or 66.

In the second mode of operation the same apparatus is used. It will be noted that the two systems are identical insofar as the laser lens 8, pin hole 10, and collimating lens 12 are concerned. Instead of inserting the film transparency 16 in the collimated light beam 14 as is done in the previous manner of operation, two film transparencies 27 and 29 are used which are inserted into the two parallel collimated beams 26 and 28, respectively. These film transparencies carry the input information in the same manner that film transparency 16 does in the first mode. However, in this system one of the input transparencies may be a photographic complement of the other, i.e., one a negative, the other a positive of the same input data. The areal modulation of beams 26 and 28 is thus seen to be complementary point for point and when passed through the remainder of the optical system, is very similar to that of the earlier mode of operation with the exception that a method is provided here to superimpose the two output images. This is accomplished by alternate diagonal mirrors 57 and 59 operating in conjunction with lenses 77 and 79. The beam passing through lens 77 is deflected at right angles by mirror 80 and continues through partially silvered mirror 82 where it is coaxial with the beam which passes through lens 79 and is reflected from the front surface of mirror 82. Both beams are thus focused to form a composite image on viewing screen 84.

The input information introduced in the form of complementary negative and positive transparencies 27 and 29 upon passing through the optical system which has been illustrated, forms an essentially featureless neutral gray field at viewing screen 84. This can be readily seen by considering that where a point on the negative input transparency has a certain density, the corresponding point on the positive will have the complementary density. Thus, as each element varies in the negative, the corresponding element varies in the opposite direction in the positive transparency with the effect that the sum of the light transmitted by the two when superimposed is essentially constant at all points on the output image.

When it is desired to accentuate specific elements in the input data, it is necessary only to remove the element of this type from one or the other of the transform planes 34 or 36. In so doing, the selected signal elements are in effect subtracted from the otherwise neutral gray of the output section with the result that by comparison with the neutral background, the features which have been removed from one transform may now be observed in bold contrast with respect to the background.

If desired the output signals from television cameras 60 and 62 may be combined in receiver 64 and substituted for output screen 84. In a further modification, these output signals can be separately used to produce different colors in receiver 64, in this case equipped with a color television tube and system. Alternatively as in the first-described method of operation, one may remove mirrors 56, 57, 58, and 59, in which case an observer 50 sees the data from lenses 46 and 48 through microscopes 52 and 54, and in which the binocular vision thus afforded results in the impression of a three-dimensional display within the optical faculties of observer 50.

Thus, having illustrated and having described two modes of operation, it is obvious to one skilled in the art that other modifications of this invention may be made without departing from the essence thereof. Therefore, it is my intention that this invention be limited only by the scope of the appended claims.

I claim:
1. In a method for enhancing and analyzing a two-dimensional display of data, the improvement comprising:
   (a) spatially modulating a beam of coherent light with input data,
   (b) optically dividing said modulated beam into at least two essentially equivalent beams,
   (c) optically directing at least two of said beams to form individual Fourier transforms of said input data,
   (d) attenuating the passage of light from selected portions of at least one of said Fourier transforms,
   (e) optically forming images simultaneously from at least two of said transforms, at least one of which contains said attenuated selected portion of said transform.

2. In a method for enhancing and analyzing two-dimensional displays of data, the improvement comprising:
   (a) spatially modulating two essentially identical coherent light beams with input data displays, one of said input data displays being substantially the photographic complement of the other,
   (b) optically forming separate Fourier transforms of said two input data displays,
   (c) optically attenuating selected areas of at least one of said transforms,
   (d) reconstructing images from both of said transforms, and
   (e) superimposing in registration the two said images.

3. An apparatus for the enhancement and analysis of spatially displayed input data comprising the following elements:
   (a) a source of substantially coherent light,
   (b) a lens array focusing said light on a pin hole aperture,
   (c) lens means to receive and collimate said light which passes through said pin hole aperture to form a collimated beam,
   (d) means for dividing said collimated beam into two essentially equivalent beams,
   (e) means to spatially modulate each of said equivalent light beams in accordance with said spatially displayed input data,
   (f) lens means in the light path of each of said modulated equivalent beams to form separate Fourier transforms of each of said beams,
   (g) optical means in at least one of said light paths to attenuate at least a portion of at least one of said Fourier transforms,
   (h) lens means in each of said light paths to reconstruct a separate image of each of said transforms, and
   (i) optical means for simultaneously viewing both of said reconstructed images.

4. An apparatus in accordance with claim 3 in which said means to spatially modulate includes at least one film transparency of said input data whereby both of said equivalent beams are modulated substantially equally and in which said optical means to attenuate (g) is adjustable, said transparency being positioned substantially normal to the beam path.

5. An apparatus in accordance with claim 3 in which said means to spatially modulate includes at least two film transparencies of said input data each interposed substantially normally in a respective one of said equivalent beams, said film transparencies being photographically complementary such that one is a negative of the other, and in which said optical means to attenuate (g) is adjustable.

References Cited

UNITED STATES PATENTS

| | | |
|---|---|---|
| 3,240,108 | 3/1966 | Lehan et al. |
| 3,305,834 | 2/1967 | Cooper et al. |
| 3,370,268 | 2/1968 | Dobrin et al. |
| 3,409,872 | 11/1968 | Hogg et al. |

JEWELL H. PEDERSEN, Primary Examiner

W. A. SKLAR, Assistant Examiner

U.S. Cl. X.R.

350—162, 169, 174